(12) United States Patent
Babuder et al.

(10) Patent No.: US 6,389,939 B1
(45) Date of Patent: May 21, 2002

(54) MULTIPLE-SPINDLE BAR MACHINE

(75) Inventors: Kirt M. Babuder, Euclid; Thomas M. Bender, Mentor; Douglas A. Joseph, Concord Township; L. Joseph Stupica, Euclid, all of OH (US)

(73) Assignee: DeVlieg Bullard II, Inc., Rockford, IL (US)

(*) Notice: Subject to any disclaimer, the term of this patent is extended or adjusted under 35 U.S.C. 154(b) by 0 days.

(21) Appl. No.: 08/297,257

(22) Filed: Aug. 26, 1994

(51) Int. Cl.[7] ............................. B23B 3/34; B23B 19/02
(52) U.S. Cl. ............................. 82/129; 82/147; 82/173
(58) Field of Search ........................ 82/126, 129, 147, 82/132, 142, 145, 162, 173

(56) References Cited

U.S. PATENT DOCUMENTS

| | | | |
|---|---|---|---|
| 2,036,685 A | | 4/1936 | Drissner |
| 2,401,072 A | * | 5/1946 | Himoff ..................... 82/147 X |
| 3,317,258 A | | 5/1967 | Hermann |
| 3,521,526 A | | 7/1970 | Olig et al. |
| 3,686,986 A | | 8/1972 | Ledergerber et al. |
| 3,735,460 A | | 5/1973 | Crachy et al. |
| 3,785,023 A | | 1/1974 | Harbottle |
| 3,943,803 A | * | 3/1976 | Hafla ........................... 82/147 |
| 4,008,634 A | * | 2/1977 | Flisch ....................... 82/124 X |
| 4,665,781 A | * | 5/1987 | Eichenhofer et al. ......... 82/129 |
| 4,790,699 A | | 12/1988 | Ringel |
| 4,987,807 A | | 1/1991 | Simon |
| 5,111,562 A | | 5/1992 | Burka |

FOREIGN PATENT DOCUMENTS

| | | | |
|---|---|---|---|
| CH | A352895 | 4/1961 | |
| DE | DT 2611799 | * 10/1976 | .................. 82/147 |
| EP | A0198223 | 3/1986 | |
| EP | A0290693 | 11/1988 | |
| GB | A2195280 | 4/1988 | |
| JP | A0203 6006 | 4/1990 | |

OTHER PUBLICATIONS

Manual entitled "Handbook for Operators—Acme–Gridley Multiple Spindle Bar Machines," copyright 1980 by National Acme Division, Acme–Cleveland Corporation.
"High–speed Spindle Units in Heavy Multi–purpose Machine Tools," Bolotnikov et al., Russian Engineering Journal, vol. 5,, No. 5, May 1985, pp. 48–50.

* cited by examiner

*Primary Examiner*—Henry Tsai
(74) *Attorney, Agent, or Firm*—Jenner & Block, LLC (57) ABSTRACT

A multiple spindle bar machine is disclosed including a cylindrical spindle carrier assembly supporting a spaced apart array of spindle bearings. Workpiece holding spindles are rotatably journaled in the spindle bearings. A hollow spindle drive shaft extends through a central opening in the spindle carrier and includes a drive gear pinned to an end of the shaft. The drive gear intermeshes with spindle gears to drive the spindles at a uniform rotational speed. The spindle carrier assembly is rotatably supported by at least one set of tapered roller bearings bearing against an outer peripheral surface of a spindle carrier. The set of roller bearings are disposed in a notched annulus in an inner peripheral surface a headstock upright. Each roller bearing forms an acute included angle between the spindle carrier outer peripheral surface and a surface of the tapered bearing facing the spindle carrier. The set of tapered roller bearing is mechanically preloaded before machining operations commence. The spindle carrier includes an interior manifold comprising passageways between the spindle bearings. A connector assembly including a swivel connector is provided to route pressurized fluid in the hollow cavity of the spindle drive shaft to the interior manifold of the spindle carrier to preload the spindle bearings.

12 Claims, 11 Drawing Sheets

MULTIPLE-SPINDLE BAR MACHINE

FIELD OF THE INVENTION

The present invention relates to a multiple spindle bar machine and, more particularly, to an improved spindle carrier and spindle carrier bearing design.

BACKGROUND ART

Multiple spindle bar machines are well known in the prior art. A multiple spindle bar machine includes a spaced apart array of four, six or eight rotatable workpiece holding spindles mounted in a spindle carrier. The spindle carrier is supported in a headstock and is intermittently rotated or indexed a fraction of a full turn. Each spindle includes a collet at one end of the spindle adjacent a machining work zone for releasably securing a piece of bar stock. A predetermined length of the bar stock extends from an end of each spindle, defining a workpiece. At each spindle carrier indexing position, cutting tools, mounted on tool slides, engage workpieces at the machining work zone to perform machining operations. Each spindle is rotated at the same angular velocity by a spindle drive shaft which extends from a gearbox housing through an aperture in the spindle carrier coincident with the spindle carrier's axis of rotation or central axis. The gearbox housing is spaced apart from the headstock and supports a motor and associated sets of gears for rotating the spindle drive shaft at a desired angular velocity and rotating a main drum shaft. The main drum shaft, drives an indexing mechanism which rotates or indexes the spindle carrier. The main drum shaft also drives sets of cams which move the tool slides and other cams which advance bar stock through its corresponding spindle to define a new workpiece.

Each spindle, and therefore each workpiece, moves in steps about the central axis of the spindle carrier as the spindle carrier indexes. For example, in a six spindle machine, a spindle completes one orbit or a 360 degree rotation every six steps or indexes of the spindle carrier, that is, each index rotates the spindle carrier 60°. As the spindle carrier indexes, a spindle moves in an arcuate path about the spindle drive shaft and the workpiece held by that spindle moves through successive spindle indexing positions within the machining work zone.

The tool slides include a hexagonal end slide, having a tool mounting surface corresponding to each spindle carrier indexing position and a plurality of cross slides, one cross slide per spindle carrier indexing position. For example, a six spindle machine has six indexing positions and six cross slides. After the spindle carrier indexes, the end slide and six cross slides, whose movement is controlled by the main drum shaft in conjunction with sets of cams, move from starting locations removed from the machining work zones toward the workpieces. Tools mounted on the end and cross slides engage the workpieces at their current spindle indexing positions to perform the machining operations. After the longest cycle machining operation is complete, the end and cross slides retract to their starting locations and the spindle carrier is indexed to the next spindle carrier indexing position. Sufficient clearance is provided between the tool slide starting locations and the workpieces so that the workpieces do not impact the tools when the spindle carrier indexes to its next position. Tools mounted on the end slide engage the workpiece in a direction parallel to the central axis, that is, parallel to the spindle drive shaft, of the spindle carrier while tools mounted on the cross slides engage the workpieces in a direction perpendicular to the spindle carrier central axis.

A bar stock pusher moves the bar stock along an axial dimension at a first spindle carrier indexing position. The spindle collet at that position opens and the predetermined length of bar stock is fed through the spindle to move a section of new unfinished bar to the machining work zone thereby defining a new workpiece. The spindle collet then closes to secure the new workpiece in position for subsequent machining operations. At successive spindle carrier indexing positions various machining operations are performed on the rotating workpiece. When the spindle carrier indexes to the final indexing position, a cut-off tool mounted on a cross slide engages and severs the completed workpiece from the remaining bar stock. Upon the next index of the spindle carrier, the spindle returns to the first indexing position and the bar feeding, machining and cut-off sequence is repeated. Performing simultaneous machining operations on four, six or eight spaced apart rotating workpieces provides significant economies of scale in the high volume manufacture of parts as compared to single spindle machines wherein only one workpiece at a time is machined.

A prior art publication entitled *Handbook for Operators— Acme Gridley Multiple Spindle Bar Machines*, copyright 1980, by National Acme Division, Acme-Cleveland Corporation, depicts the design and operation of a multiple spindle bar machine. The foregoing publication is incorporated herein in its entirety by reference.

In spite of the production efficiency of multiple spindle bar machines, problems remain relating to machining accuracy, tool chatter and dimensional stability of pieces produced over time. Many of these problems can be traced to the effects of heat on a multiple spindle bar machine. In addition to the actual metal cutting operations, operation of the machine involves a complex set of rotating drive shafts and gears, sprockets and spindles, sprocket chains and clutches, rotating cams and engaging cam followers, all of which generate a significant amount of thermal energy. As various components of the bar machine are heated, they expand at differing rates depending on their heat absorption and dissipation properties and machining precision suffers. Cooling the entire machine is not a feasible alternative. Especially critical to machining precision is the position of the spindle carrier.

The spindle carrier is rotatably supported in a bore in the headstock by two spaced apart roller bearing assemblies. Conventionally, the two spindle carrier roller bearings provided radial support to the spindle carrier, but did not provide axial support. That is, the spindle carrier was permitted to move axially within the headstock bore. Axial support for the spindle carrier was provided by a bearing coupled to the gearbox housing and a tubular spindle carrier stem overlying a portion of the spindle drive shaft, the carrier stem was coupled to the spindle carrier near one end of the carrier stem and rotatably journaled in the gearbox housing bearing at an opposite end of the carrier stem. The gearbox housing bearing provided both thrust and axial support to the carrier stem, that is, the bearing prevented both lateral and axial movement of the carrier stem. Since the spindle carrier was pinned to the carrier stem, axial movement of the spindle carrier was also constrained by the gearbox housing bearing.

Experience has taught the aforementioned structure for axially constraining the spindle carrier resulted in a loss of machining accuracy due to thermal expansion of the spindle carrier stem during operation of the bar machine. The expansion of a tube in the axial direction when heated is proportional to the tube's length. As the bar machine heated up during operation, the tubular carrier stem would expand axially. The axial expansion of the carrier stem over the distance between the gearbox bearing, which constrained the carrier stem, and the pinned spindle carrier resulted in a significant axial displacement of the spindle carrier within the headstock bore. The axial displacement of the spindle carrier as the bar machine heated up and cooled down unacceptably degraded machining accuracy.

DISCLOSURE OF THE INVENTION

A multiple spindle bar machine constructed in accordance with the present invention includes a new and improved bearing structure for rotatably supporting a spindle carrier for indexed movement through multiple work orientations. A bar machine headstock includes first and second spaced apart uprights having a throughbore dimensioned to receive the spindle carrier. First and second sets of tapered roller bearings support the spindle carrier. A bearing loading plate applies a force to the first and second sets of roller bearings to minimize lateral movement of the bearings relative to the spaced apart uprights. The first and second sets of tapered roller bearings are circumferentially spaced around the outer surface of the spindle carrier. Each bearing in the first and second sets of bearings rotate about an axis transverse to an axis of rotation of the spindle carrier.

The tapered bearings maintain a precise axial alignment and positional relationship between the spindle carrier and the cutting tools regardless of the thermal expansion of the bar machine components during operation thereby insuring accurate and consistent machining.

The bar machine spindle carrier is supported by a base that also supports a drive system for simultaneously rotating multiple bars. The headstock is coupled to the base and maintained in a spaced relation to a gearbox also coupled to the base and housing a portion of the drive system. The spindle carrier supports a plurality of spaced apart rotatable bar holding spindles. Each spindle is coupled to a spindle drive gear and is journaled in a spindle bearing. The spindle carrier includes a throughbore aligned with a longitudinal axis of the spindle carrier and an interior manifold for routing pressurized fluid to preload each of the spindle bearings. A hollow spindle drive shaft extends through the spindle carrier throughbore and has a drive gear pinned to an end of the drive shaft. The drive gear intermeshes with each of the spindle drive gears providing uniform rotation of the spindles.

A fluid coupling at an opposite end of the spindle drive shaft from the drive gear injects pressurized fluid into the drive shaft. A fluid coupling at the drive gear end of the drive shaft routes fluid from the drive shaft hollow cavity to the spindle carrier interior manifold. Preferably, the fluid coupling at the drive gear end of the drive shaft includes a swivel connector coupled to the drive shaft and in fluid communication with the hollow cavity, a second connector coupled to the spindle carrier and in fluid communication with the spindle carrier manifold and a tube connected between the swivel connector and the second connector.

These and other objects, advantages and features of the invention will become better understood from a detailed description of a preferred embodiment of the invention which is described in conjunction with the accompanying drawings.

DETAILED DESCRIPTION

Figure 1:
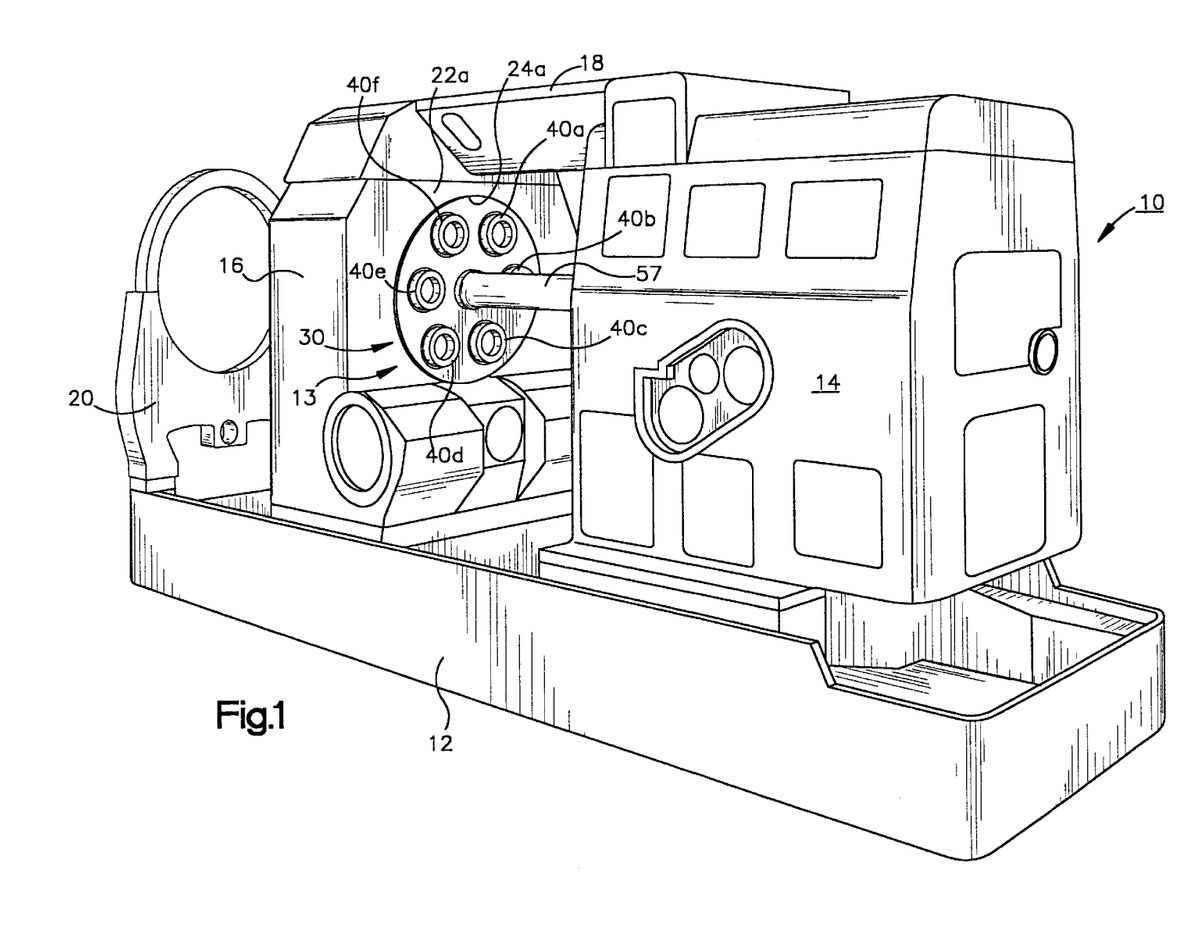
FIG. 1 is a perspective view of a multiple spindle bar machine of the present invention.

Turning to the drawings, FIG. 1 is a perspective view of a multiple spindle bar machine 10 constructed in accordance with a preferred embodiment of the present invention. The bar machine 10 includes a cast base or pan 12 that collects metal chips produced during machining operations and serves as a sump for cooling fluids used to transmit heat away from a machining work zone 13 during operation of the bar machine 10. A gearbox housing 14 is coupled to and extends upwardly near one end of the pan 12. In spaced apart relationship from the gearbox housing 14 is a headstock 16 also extending upwardly from and attached to the pan 12. A top plate 18 connects the gearbox housing 14 and the headstock 16 near a top portion of each. The top plate 18 ties the gearbox housing 14 and headstock 16 together and holds them firmly in alignment. A tailstock support 20 extends upwardly near an end of the pan 12 opposite the gearbox housing 14. The headstock 16 includes two uprights 22a, 22b having aligned throughbores 24a, 24b respectively. Upright 22a is closest to the gearbox housing 14, while upright 22b is closest to the tailstock support 20. Only upright 22a and throughbore 24a can be seen in FIG. 1, while in FIG. 3, each can be seen in cross section. Rotatably supported in the upright throughbores 24a, 24b is a cylindrical spindle carrier 30. The carrier 30, in turn, supports six workpiece holding spindles 40a–40f in bores which are uniformly radially spaced through the carrier.

Figure 2:
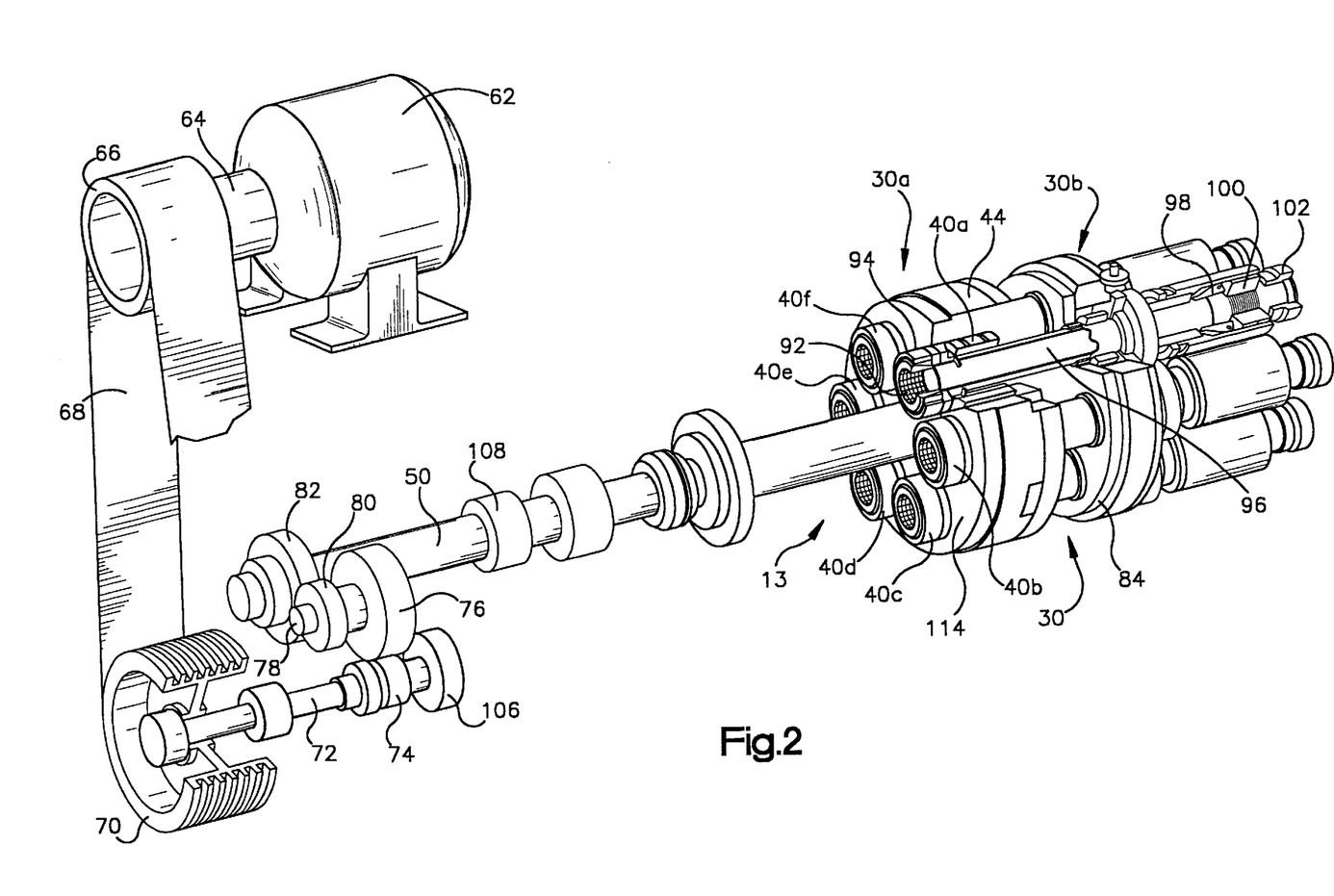
FIG. 2 is a perspective view showing a drive system of the multiple spindle bar machine of FIG. 1 including a spindle drive shaft and a spindle carrier supporting a spaced apart array of spindles.
Figure 3:
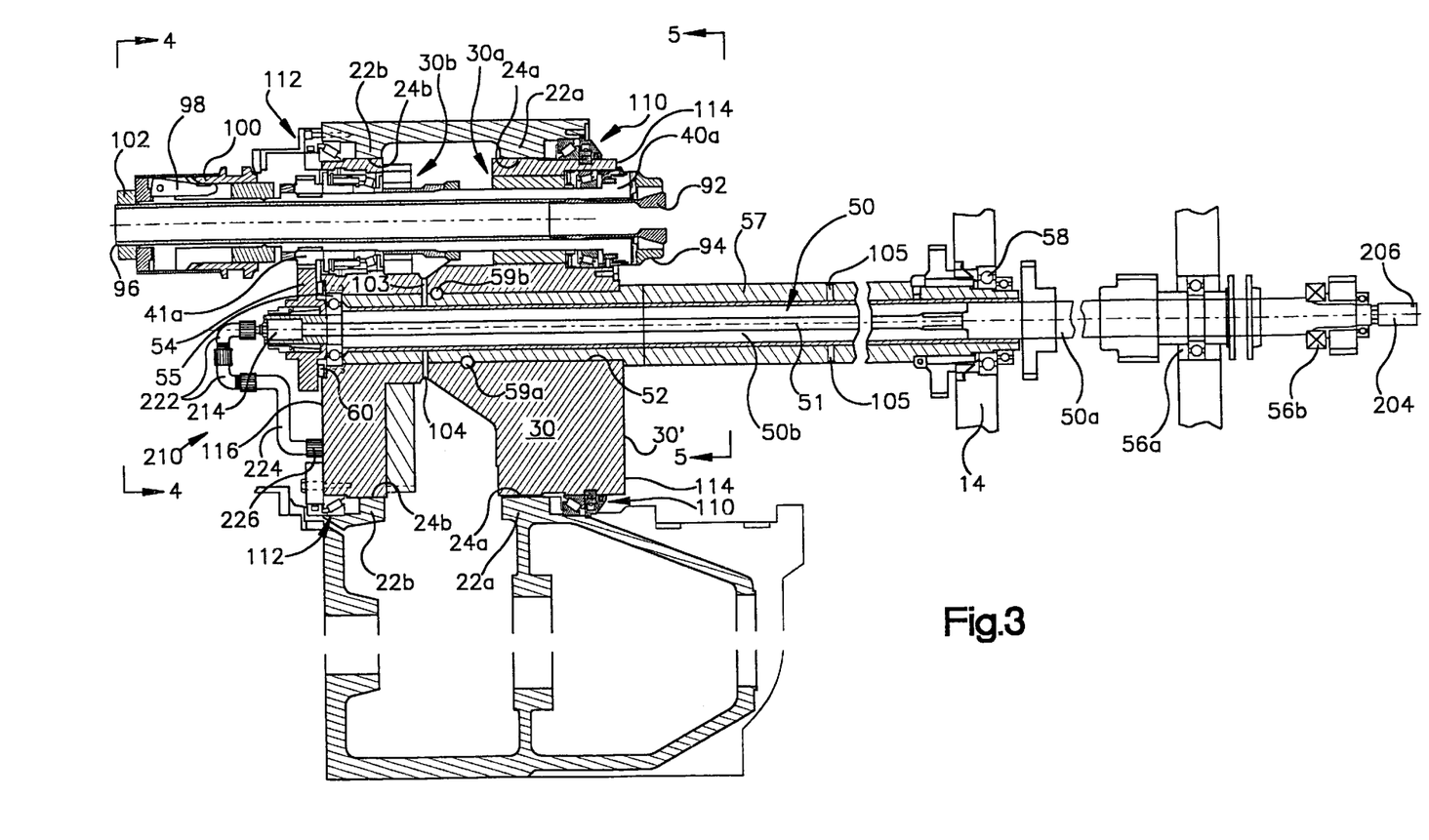
FIG. 3 is a view of the spindle carrier supported in a headstock and the spindle drive shaft, partly in elevation and partly in section to show details of one of six spindles supported in the spindle carrier.

Turning to FIGS. 2 and 3, the spindles 40a–40f and the workpieces (not shown) extending from the spindles into the machining work zone 13, are rotatably driven with respect to the spindle carrier 30 by a spindle drive shaft 50 which extends through a central aperture 52 in the spindle carrier 30. The spindle carrier central aperture 52 is coincident with the carrier's axis of rotation or central axis. The spindle drive shaft 50 is comprised of two sections 50*a*, 50*b* (best seen in FIG. 3), the sections being press fit together. The first section 50*a* is supported within the gearbox housing 14, while the second section 50*b* extends from the gearbox housing 14 through the spindle carrier central aperture 52. A passageway 51 extends the length of the spindle drive shaft 50. Coupled to an end of the spindle drive shaft 50 extending through the spindle carrier central aperture 52 is a drive gear 54 (seen in FIGS. 3 and 4) which engages a set of six identical driven gears.

Each of the driven gears is coupled to an outer periphery of a respective spindle 40*a*–40*f*. Only one of the driven gears 41*a*, which is coupled to spindle 40*a*, can be seen in FIG. 3, while in FIG. 4, all the driven gears 41*a*–41*f*, can be seen schematically. Rotation of the spindle drive shaft 50 causes rotation of the spindles 40*a*–40*f* (and workpieces supported thereby) at a uniform angular velocity. The spindle drive shaft 50 is rotatably supported within the spindle carrier central aperture 52 by a bearing 55 adjacent drive gear 54. Within the gearbox housing 14, the spindle drive shaft 50 is supported by bearings 56*a*, 56*b*.

Figure 6:
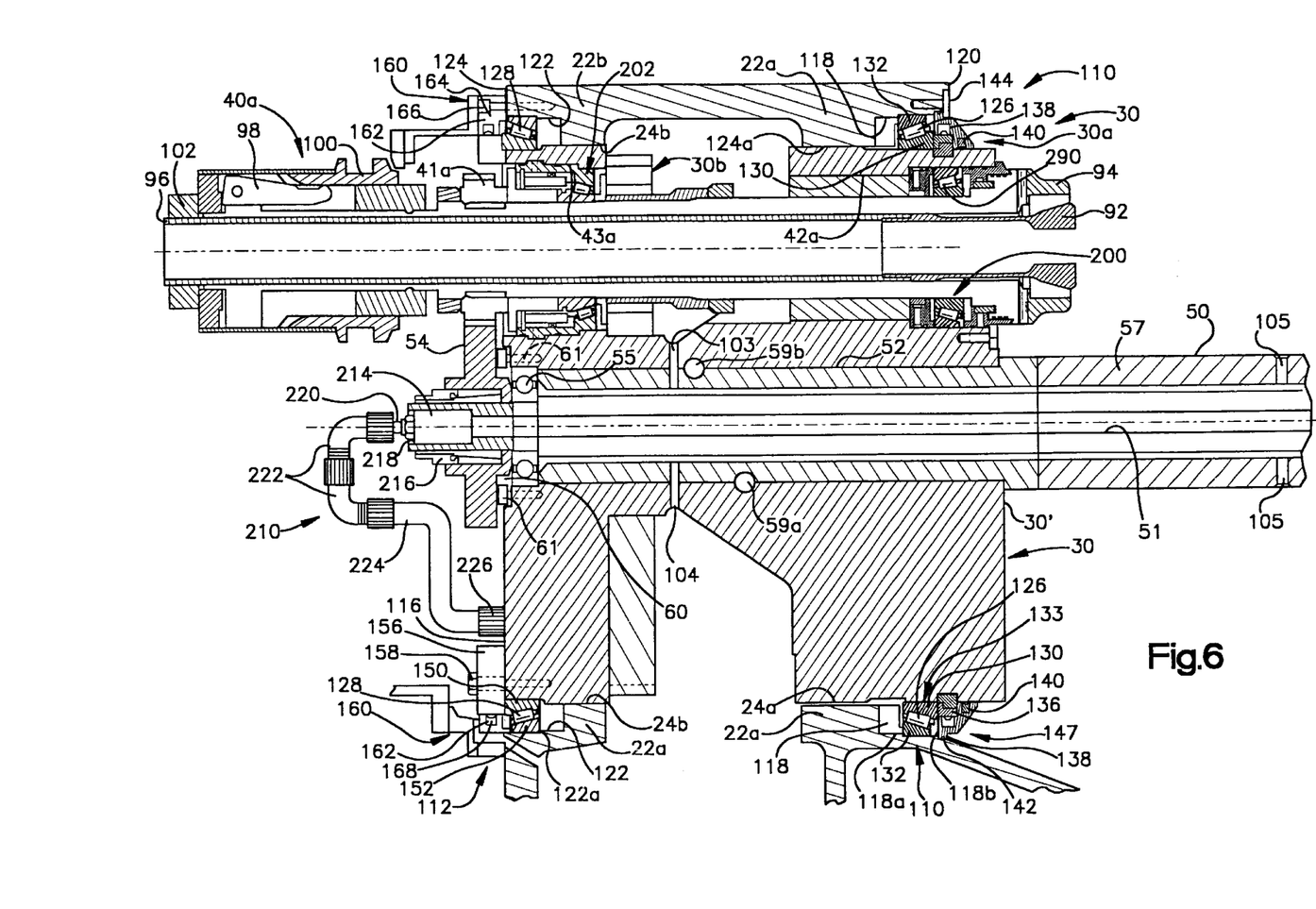
FIG. 6 is a longitudinal sectional view of the spindle carrier of FIG. 3 showing one of the six spindles and a portion of the spindle carrier drive shaft.

Overlying a section of the spindle drive shaft 50 is a tubular spindle drive shaft carrier stem 57 (FIGS. 3 and 6). The carrier stem 57 is rotatably journaled at end one in a roller bearing 58 which is disposed in an opening in the gearbox housing 14 (FIG. 3) and pinned to the spindle carrier 30 adjacent the carrier's central aperture 52 by two spaced apart tapered pins 59*a*, 59*b*. The roller bearing 58 supports the carrier stem 57 radially, but does not provide significant thrust support, this is, it does not support the carrier stem 57 (nor the spindle carrier 30) in the axial direction. Axial support for the spindle carrier 30 and the carrier stem 57 is provided by two preloaded spindle carrier bearings 110, 112, as will be described. Spindle drive shaft bearing 55 is axially secured in the spindle carrier central aperture 52 by a flange 60 overlying an outer ring or cup of the bearing. The flange 60 is secured by bolts 61 extending through apertures in the flange and threading into apertures in the spindle carrier 30. The flange 60 forces the cup of bearing 55 against an end of spindle carrier stem 57.

Providing rotational power to the spindle drive shaft 50 is a drive system supported by the gearbox housing 14. The drive system includes a motor 62 having an output shaft 64 coupled to a drive pulley 66. Reeved over the drive pulley is a drive belt 68 which engages a driven pulley 70. The driven pulley 70 is fixed to a pulley shaft 72 having a gear 74 at one end. (Please note that all gears in FIG. 2 are shown schematically for ease in depiction.) The pulley shaft gear 74 engages and rotates a spindle speed range gear 76 which, in turn, is coupled to a speed range gear shaft 78. Also affixed to the speed range gear shaft 78 is a spindle speed change gear 80 which drives a drive gear 82 pinned to the spindle drive shaft 50.

The spindle carrier 30 is rotated or indexed in fixed increments about the spindle drive shaft 50 by an indexing mechanism (not shown) of conventional design. The indexing mechanism includes a gear which engages a spindle carrier drive gear 84 to rotate the spindle carrier 30. On a six spindle machine, the spindle carrier 30 is rotated one sixth of a complete revolution or 60° with each index thereby defining six indexing positions at which machining operations take place in the machining work zone 13. A given spindle, for example 40*a*, must increment six times to make a complete orbit about the spindle drive shaft 50. The indexing mechanism is driven by a main drum shaft (not shown).

The tailstock support 20 includes an opening 90 (FIG. 1) which rotatably supports a bar stock reel geared ring (not shown). The bar stock reel geared ring supports six spaced apart bar stock reel tubes (not shown) which are arrayed so as to be aligned with the spindles 40*a*–40*f*. Lengths of bar stock (not shown) are inserted into the reel tubes and are pushed forward to extend into each reel tube's corresponding aligned spindle. Each spindle 40*a*–40*f* includes a bar stock feeding apparatus of conventional design to feed out a predetermined length of bar stock from the spindle into the machining work area 13 at a specified first indexing position to define a new workpiece.

Figure 13:
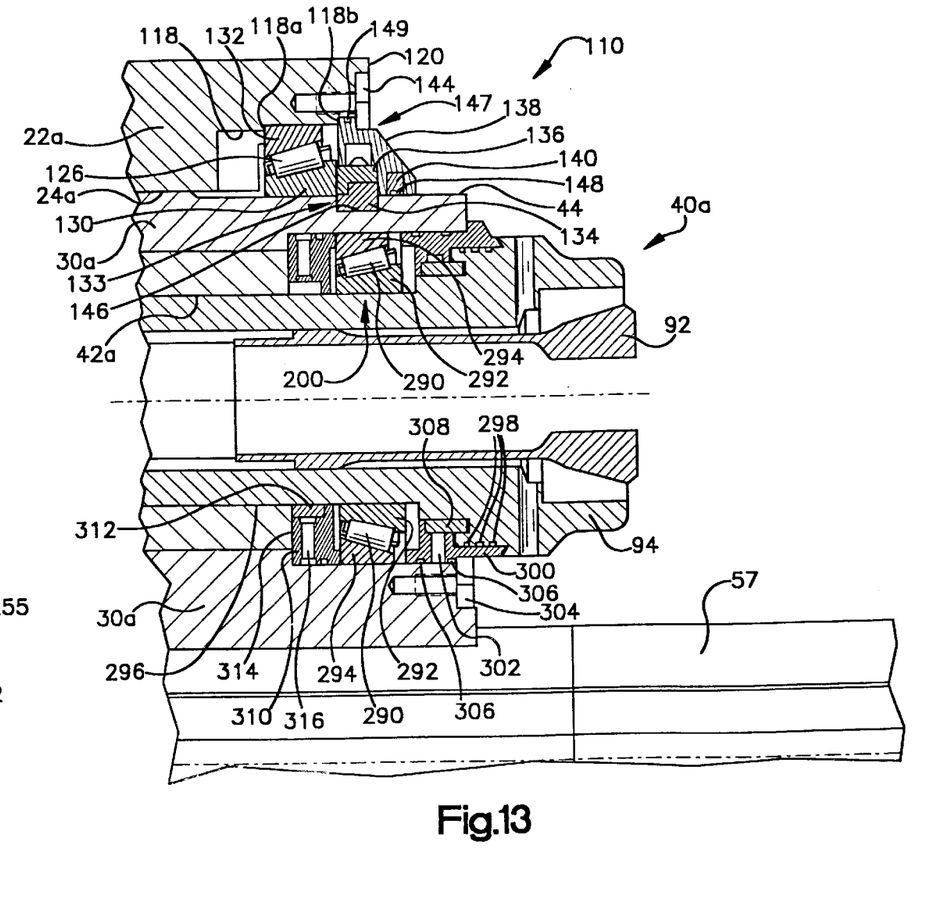
FIG. 13 is an enlarged section view of a portion of the spindle carrier of FIG. 3 and a front portion of one spindle including a front spindle bearing.

Certain components of the bar stock feeding apparatus can be seen in the cut away view of spindle 40*a* of FIG. 2 as well as in the sectional view of spindle 40*a* seen in FIG. 3, 6 and 13. The bar stock feeding apparatus includes a bar stock gripping collet 92 mounted in a nose 94 of the spindle 40*a*, a pusher tube 96 and collet actuating fingers 98 (one finger is seen in FIGS. 3 and 6). When the collet actuating fingers 98 spread apart, the collet 92 is moved forward in the spindle nose 94, that is, toward the machining work zone 13 and the collet opens. When the collet actuating fingers 98 close up, the collet 92 is pulled backward in the spindle nose 94 and the collet closes. The stock feeding apparatus further includes a finger holder spool 100 slideably overlying the collet actuating fingers 98. An internal diameter of the finger holder spool 100 is such that in one spool position the collet actuating fingers 98 are closed up and in another position the collet actuating fingers are spread open. A pusher tube end flange 102 is coupled to an end of the pusher tube 96.

Adjacent the first indexing position (spindle 40*c* is at the first indexing position in FIG. 2), two cams, driven by the main drum shaft, rotate in synchronization to simultaneously move a collet operating slide (not shown) and a stock feed cam following slide (not shown) forward. The forward movement of the stock feed and collet operating slides, in turn, moves the finger holder spool 100 and the pusher tube end flange 102 forward. Moving the pusher tube end flange 102 forward advances the pusher tube 96 which, in turn, advances the bar stock into the machining work zone 13 at the first indexing position. Moving the finger holder spool 100 forward permits the collet actuating fingers 98 to spread apart thereby moving the collet forward in the spindle nose 94. Moving the collet 92 forward opens it to permit the advancing bar stock to move past the collet into the machining work zone 13. As the bar stock is being advanced from the spindle at the first indexing position, a bar stock stop (not shown) moves to a position in the machining work zone 13 in front of the spindle nose 94 to limit the advancement of the bar stock to a desired, predetermined amount.

Advancement of the bar stock at the first indexing position defines a new workpiece. The workpiece will be machined at subsequent indexing positions as the spindle carrier 30 indexes in a counterclockwise orbit about the spindle drive shaft 50, that is, counterclockwise as the spindle carrier is viewed from the machining work zone 13. At each successive indexing location, different machining operations are performed by tools (not shown) engaging the workpiece. Simultaneously, other tools engage and perform machining operations on workpieces at other spindle carrier indexing locations.

Certain tools are mounted on an end tool slide (not shown), which moves parallel to a longitudinal axis of the workpiece (that is, parallel to the spindle drive shaft 50) and typically performs drilling operations. The end tool slide is slideably mounted on the spindle carrier stem 57 and is driven by the main drum shaft (not shown) in conjunction with a set of cams (not shown). A lubricating oil passageway 103 is provided through the wall of the spindle carrier stem 57. The oil introduced through passageway 103 forms a lubricating film in a gap between the overlying spindle carrier stem 57 and the spindle drive shaft 50 rotating within the carrier stem. Most of the lubricating oil exits through the an outlet passageway 104 but a portion of the oil travels down the gap and exits through passageways 105. The end tool slide (not shown) overlies the passageways 105. The oil exiting the passageways provides lubrication between an exterior surface of the carrier stem 57 and the end tool slide mounted thereto.

Other tools are mounted on six cross slides (not shown) which are provided, one for each indexing position. The cross slides support tools which engage and machine a workpiece in a direction perpendicular to the longitudinal axis of the workpiece. Turning and threading are typical operations performed by tools mounted on cross slides. At the final indexing position (spindle 40d is at the final indexing position in FIG. 2), the completed workpiece is cut off from the bar stock and falls into a trough (not shown) which routes the completed workpiece to a parts basket (not shown).

A rotational speed of the main drum shaft (not shown) determines a travel speed of the end and cross slides. During the idle time portion of the machining cycle, that is, when machining operations are not being performed, the drum shaft is rotated at a high speed (30 revolutions per minute) providing rapid movement of the end and cross slides. The power to drive the main drum shaft at the high rotational speed is taken from the pulley shaft 72 through a set of gears including gear 106 and a clutch assembly (not shown). During the machining portion of the machine cycle, that is, when cutting tools are performing metal cutting operations on the workpieces, the end and cross slides must travel at a much lower speed. Therefore, the rotational speed of the drum shaft is reduced to between 1–15 rpm, depending on the material characteristics of the workpieces being machined. For example, if a hard material such as 316 stainless steel is being machined, a main drum shaft rotational speed as low as 1 rpm may be required while a rotational speed of up to 15 rpm may be suitable for a ductile material such as aluminum. The main drum shaft is driven at a desired low rotational speed by the spindle drive shaft 50 through a combination of gears, including gear 106 coupled to the spindle drive shaft, and a set of clutches (not shown).

Turning to FIG. 6, front and rear spindle carrier bearing assemblies 110, 112 at opposite ends of the spindle carrier 30 support the carrier for indexed rotation within the headstock upright throughbores 24a, 24b. Bearing geometry and preloading of the bearing assemblies 110, 112 contribute to accurate positioning of the spindle carrier 30 and insure its positional stability over a broad range of bar machine operating temperatures resulting in consistent, precise machining.

The front spindle bearing assembly 110 is located near a front end 114 of the spindle carrier 30, that is, the end of the spindle carrier adjacent the machining work zone 13. The bearing assembly 110 is supported in an counterbore 118 extending radially outwardly from upright throughbore 24a adjacent an end 120 of the headstock upright 22a. The rear spindle bearing assembly 112 is located near a rear end 116 of the spindle carrier 30, that is, facing the tailstock support 20. The bearing assembly 112 is supported in a counterbore 122 extending radially outwardly from upright throughbore 24b adjacent an end 124 of the headstock upright 22b. These spindle carrier bearing assemblies 110, 112 are built by Timkin and are superior to the normal caged roller ball bearings that have been used in this type of machine in the past. As opposed to ball bearings, each of the spindle carrier bearing assemblies 110, 112 include a plurality of rollers 126, 128 having a tapered or wedge-shaped configuration.

As can best be seen in FIGS. 6 and 13, the tapered rollers 126 of bearing assembly 110 are rotatably confined between an inner ring or cone 130 and an outer ring or cup 132. The cup 132 is pressed into the counterbore 118 and seats against an inwardly stepped portion or shoulder 118a of the counterbore, while the cone 130 is forced over the spindle carrier 30 and seats against a front retaining ring set 133. The cup 132 and the cone 130 are installed before the spindle carrier 30 is inserted into the upright throughbores 24a, 24b. To install the cup 132, which has an outer diameter at room temperature just greater than the counterbore inner diameter at the same temperature, the cup is subjected to cold temperatures to reduce its outer diameter and then force fit into the counterbore 118 and is seated against the counterbore shoulder 118a. To install the cone 130, which has an inner diameter at room temperature just less than the spindle carrier diameter at the same temperature, the cone is heated to expand its inner diameter. The expanded cone 130 is then slid over the spindle carrier just beyond an annular notch 146 which provides a seat for a front retaining ring set 133. After the cup 132 is installed, the front retaining ring set 133 is secured in the annular notch 146 and the cone 130 is seated against the front retaining ring set by tapping cone gently with a hammer to move it forward on the spindle carrier, that is, toward the front retaining ring set. The spindle carrier 30 is then inserted through the headstock throughbores 24a, 24b from the gearbox 14 side of the machine. Because of angles of contact between the rollers 126, cone 130 and cup 132 force the rollers 126 outwardly away from the central axis of the spindle carrier 30.

Holding the cone 130 in place against the rollers 126 is the front retaining ring set 133 including a two piece retaining ring 134 and an overlying retaining ring 136. The two piece retaining ring 134 comprises two matching semicircular segments which are seated in an annular notch 146 in the spindle carrier outer peripheral surface 44. The two piece retaining ring 134 is secured in place by an overlying retaining ring 134.

Figure 5:
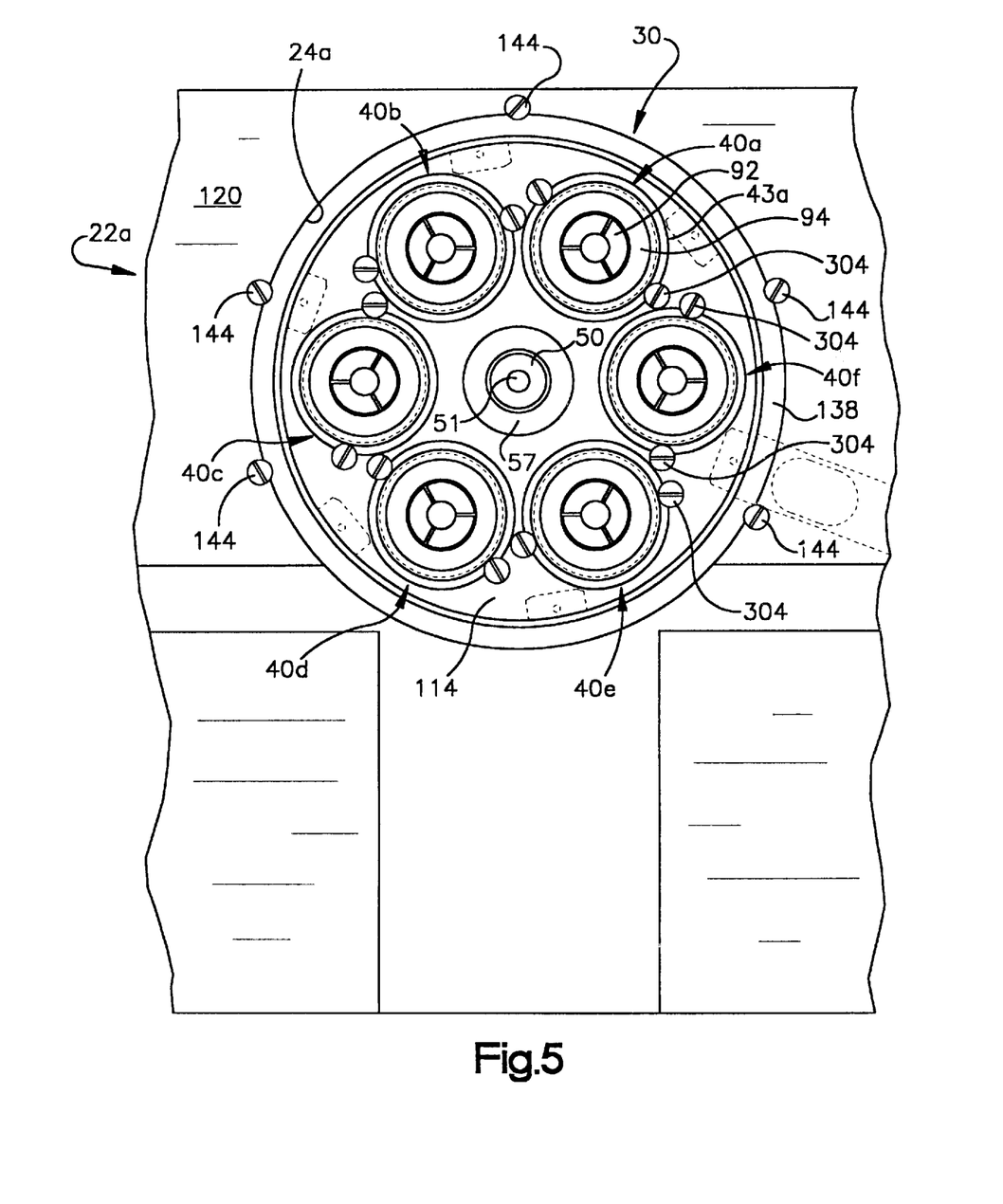
FIG. 5 is an end view of the spindle carrier of FIG. 3 as seen from a plane indicated by the line 5—5 in FIG. 3.

A sealing assembly 147 (FIG. 13) is coupled to the headstock upright 24a to prevent contaminants from entering the spindle carrier bearing assembly 110. The sealing assembly includes a front seal ring 138, a spindle carrier seal 140, an O-ring 142 and five retainer screws 144 (only one of which can be seen in FIGS. 6 and 13, but all five of which can be seen in FIG. 5). The front seal ring 138 is coupled to the headstock upright 22a and includes a notch 148 in an inner peripheral surface which accommodates the spindle carrier seal 140. The seal 140 engages the outer peripheral surface 44 of the spindle carrier 30. The seal 140 includes a v-shaped cut out in its spindle carrier engaging surface to reduce the contact area and friction between the spindle carrier 30 and the seal. As best seen in FIG. 5, the front seal ring 138 is secured to the headstock upright end 120 by the five retainer screws 144 which thread into spaced apart apertures in the headstock upright end. The retainer screws 144 include cap portions which partially overlie and bear against the front seal ring forcing it against the shoulder 118a of the counterbore 118. The front seal ring 138 further includes a groove 149 on its outer peripheral surface. The O-ring 142 seats in the outer peripheral surface groove of the front seal ring 138 to provide a positive seal with the headstock upright 22a.

The orientation and taper of the rollers 126 is such that if lines are drawn perpendicularly to of cone contacting surface of each roller, the lines would intersect at a point X (FIG. 3) which is aligned with an axis of rotation of the spindle carrier 20. The point X is situated forward of a front end 30' of the spindle carrier 30 and rearwardly of a plane Y—Y extending through a front surface of each of the six spindle collets 92. Further each roller 126 forms an acute angle between the outer peripheral surface 44 of the spindle carrier 30 and an axis of rotation or central axis of the roller.

Figure 4:
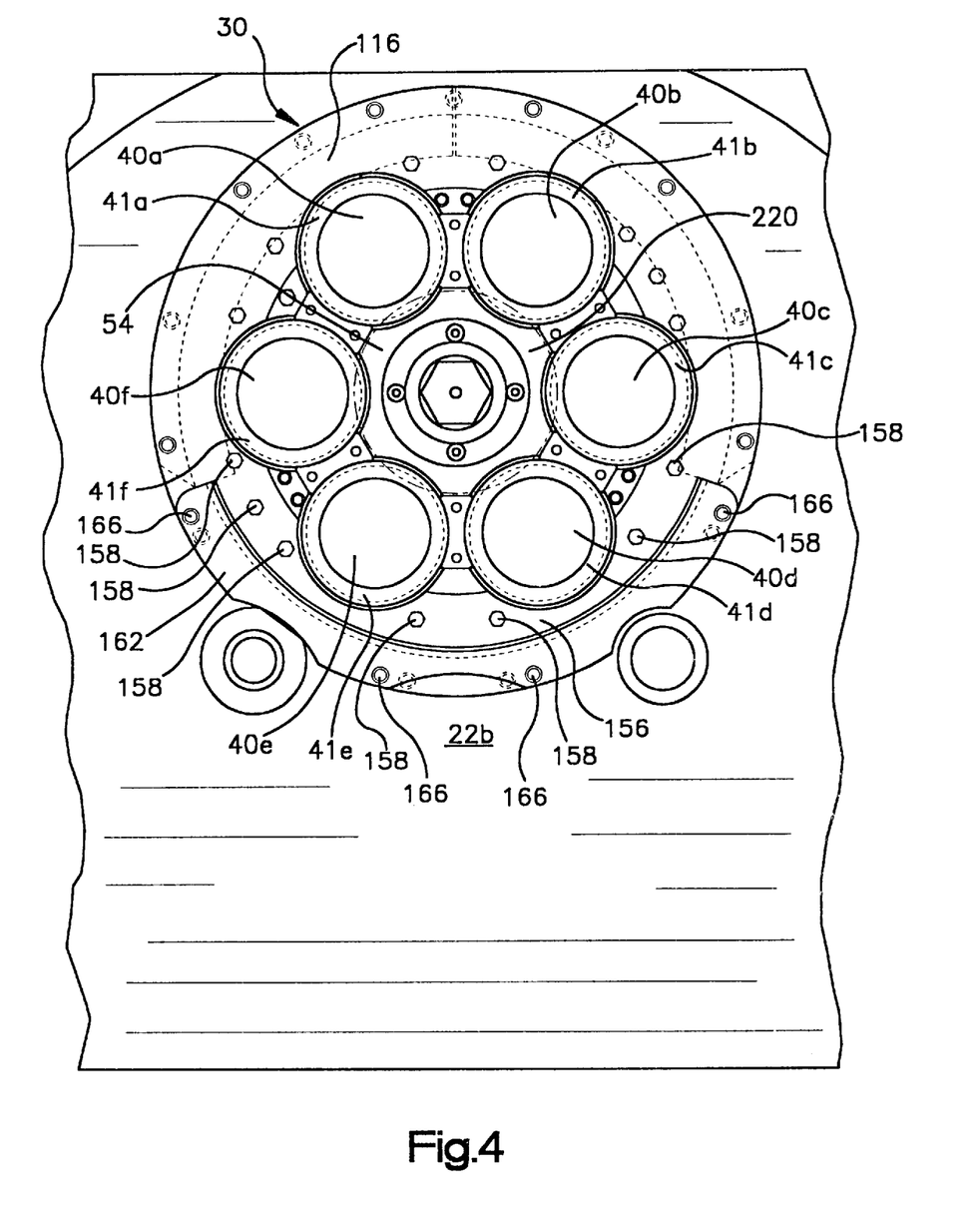
FIG. 4 is an end view of the spindle carrier of FIG. 3 as seen from a plane indicated by the line 4—4 in FIG. 3.

Turning to FIGS. 4 and 6, the spindle carrier bearing assembly 112 is identical to bearing assembly 110 only the cone retaining structure and the sealing structure are somewhat different. The tapered rollers 128 of the spindle carrier bearing assembly are rotatably confined between an inner ring or cone 150 and an outer ring or cup 152. The cone 150 frictionally engages the outer peripheral surface 44 of the spindle carrier 30 and rotates with it when the carrier indexes. The cup 152 frictionally engages the headstock upright counterbore 122 and is wedged against a radially stepped portion or shoulder of counterbore 122a. The cup 152 is installed when the front spindle bearing cup 132 is installed, that is, before the spindle carrier 30 is inserted into the upright throughbores 24a, 24b. To install the cup 152, which has an outer diameter at room temperature just greater than the counterbore inner diameter at the same temperature, the cup is subjected to cold temperatures to reduce its outer diameter and then force fit into the counterbore 122 and is seated against the counterbore shoulder 122a. After the spindle carrier 30 is inserted into the headstock throughbores 24a, 24b, the cone 150, which has an inner diameter at room temperature just less than the spindle carrier diameter at the same temperature, is heated to expand its inner diameter. The expanded cone 150 is then slid over the spindle carrier into contact with rollers 128.

As was the case with bearing assembly 110, contact angles between the rollers 128, cone 150 and cup 152 force the rollers 128 outwardly away from the central axis of the spindle carrier. To force the cone 150 against the rollers 128, a rear retaining ring 156 is coupled to the spindle carrier 30 and overlies an outwardly facing portion of the cone. The ring 156 is secured to the spindle carrier 30 with fourteen hex head cap screws 158 (one of which can be seen in FIG. 6 and all of which can be seen in FIG. 4) extending through apertures in the ring and thread into aligned apertures in the headstock upright end 124. Tightening the screws 158 exerts an extremely large axial force on cone 130, approximately 15,000 psi. The axial force on cone 130 preloads both bearing assemblies 110, 112. Recall that the cone 130 of bearing assembly 110 is constrained to bear against the rollers 126 by the retaining assembly 133. Thus, when the rear retaining ring 156 exerts axial force on cone 150 and equal and opposite force is exerted by retaining assembly 133 on cone 130. The resultant of these large axial forces is a preloading or compressing of both sets of rollers 126, 128 to the extent that a diameter of each roller is reduced. A face of the rear retaining ring 156 is ground to the extent necessary to provide an appropriate fit subject to the axial tolerances of spindle carrier bearings 110, 112 and the spindle carrier 30. The preloading produces a highly stable spindle carrier position regardless of machining load or operating temperature.

A sealing assembly 160 is coupled to the headstock upright 24b to prevent contaminants from entering the spindle carrier bearing assembly 112. The sealing assembly 160 includes a rear seal ring 162, a rear retaining ring seal 164, nine socket head cap screws 166 (only one of which can be seen in FIGS. 6 and four of which can be seen in FIG. 4). The rear seal ring 162 is coupled to the headstock upright 22b and includes a notch 168 in an inner peripheral surface which accommodates the rear retaining ring seal 164. The seal 164 engages the outer peripheral surface of the rear retaining ring 156. The seal 164 includes a v-shaped cut out in its retaining ring engaging surface to reduce the contact area and friction between the retaining ring and the seal. As best seen in FIG. 5, the rear seal ring 162 is secured to the headstock upright end 124 by the nine socket head screws 166 which pass through spaced apart apertures in the seal ring and thread into aligned apertures in the headstock upright end.

FIGS. 3, 6 and 13 show one 40a of the six spindles which is supported by two bearings, a front spindle bearing 200 disposed in bore 42a in a front portion 30a of the spindle carrier 30 and a rear spindle bearing 202 disposed in bore 43a in a rear portion 30b of the spindle carrier for allowing relative rotation between the spindle 40a and the spindle carrier 30. Each of the six spindles 40a–40f is similarly supported by identical pairs of spindle bearings (which for convenience will be referred to by the same reference numbers 200, 202) rotatably supported in the spindle carrier bores 42a–42f and 43a–43f. Only two representative spindle bearings 200 and 202 are illustrated, but the illustration and corresponding description is applicable to the corresponding front and rear spindle bearings for all six spindles. Each of the rear spindle bearings 202 is advantageously preloaded by fluid pressure to insure precise positioning of the spindles (and thereby the workpieces supported by the spindles) with respect to the spindle carrier 30. Additionally, two fluid pressure seals are provided at each of the front spindle bearings 200 to block contaminants from infiltrating the bearings. A fluid transmission delivery system is provided to route pressurized fluid from an external source to the front and rear spindle bearings 200, 202.

Figure 7:
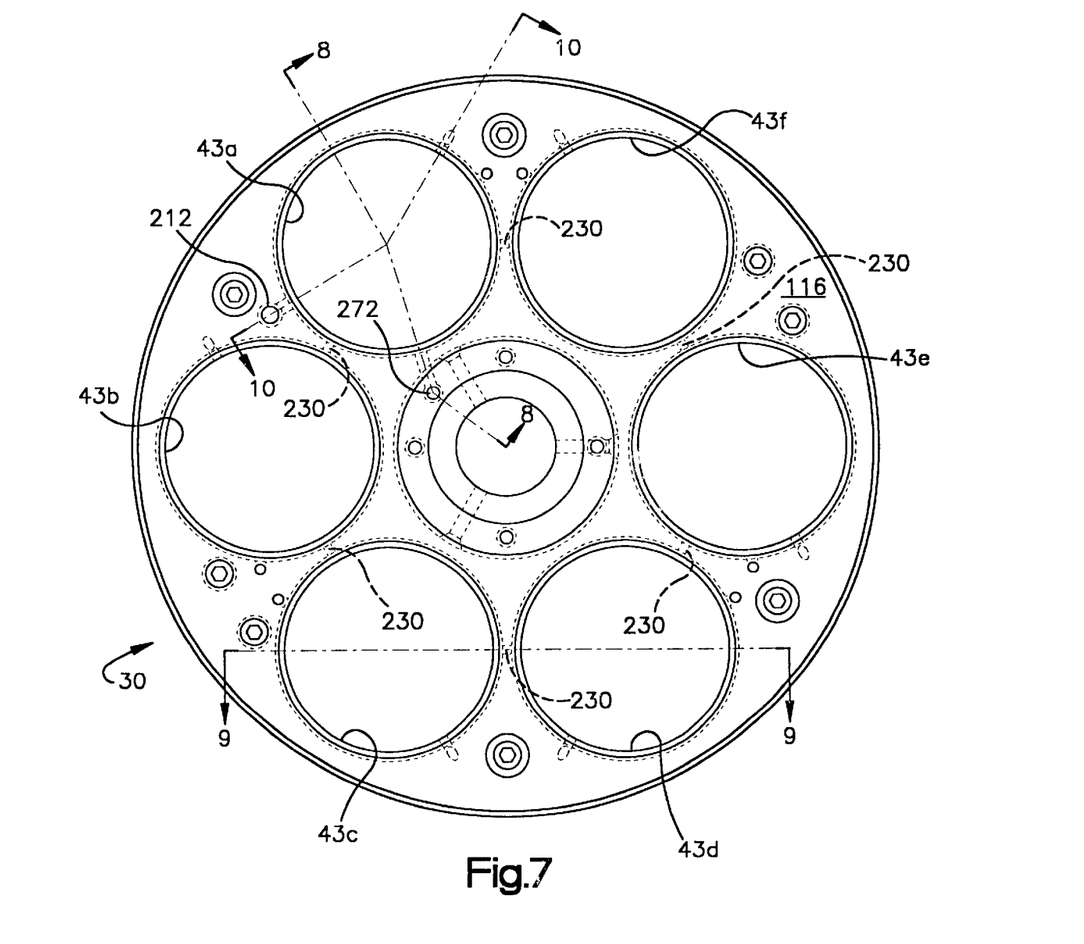
FIG. 7 is an end view of the spindle carrier of FIG. 4 with the spindles removed for clarity and showing portions of a fluid delivery manifold in phantom.

As explained previously and as can be seen in FIGS. 3 and 6, the spindle drive shaft 50 includes a longitudinal passageway 51 extending the length of the shaft. A rotating union 204 (FIG. 3) threads (preferably a left handed thread) into a tapped hole in an end of the spindle drive shaft 50 disposed in the gearbox housing 14. The union 204 includes a side wall with a tapped hole 206 adapted to receive a coupling (not shown). An external source of pressurized fluid (not shown) is coupled to the tapped hole 206 to pressurize the spindle drive shaft passageway 51. The pressurized fluid preferably is air. A rotating fluid coupling structure 210 is provided to route the pressurized fluid in the spindle drive shaft passageway 51 to an fluid inlet opening 212 in the spindle carrier rear end 116. The fluid coupling structure 210 must be rotatable because of the relative rotation between the spindle drive shaft 50 and the spindle carrier 30. As can best be seen in FIG. 6, the fluid coupling structure 210 includes a rotating in-shaft union 214 which extends into the end of the drive shaft and is in fluid communication with the drive shaft passageway 51. The union 214 is secured in the spindle drive shaft by a tran-torque coupling 216, which is coupled to spindle drive shaft drive gear 54, and a retaining ring 218. The union includes a threaded bore in an outwardly extending portion of the union adapted to receive a straight coupling 220. Straight coupling 220 is, in turn, connected to two coupled right angle couplings 222. An end of a flexible hose 224 is connected to an end of one of the right angle couplings 222 and coupled at the other end to a coupling 226 threaded into the spindle carrier fluid inlet opening 212 (the opening, not shown in FIGS. 3 and 6 is seen in FIG. 7 and in section in FIG. 10). As the spindle carrier 30 rotates through the sequential indexing positions, the fluid coupling structure 210 rotates to supply pressurized fluid to the inlet opening 212.

Figure 8:
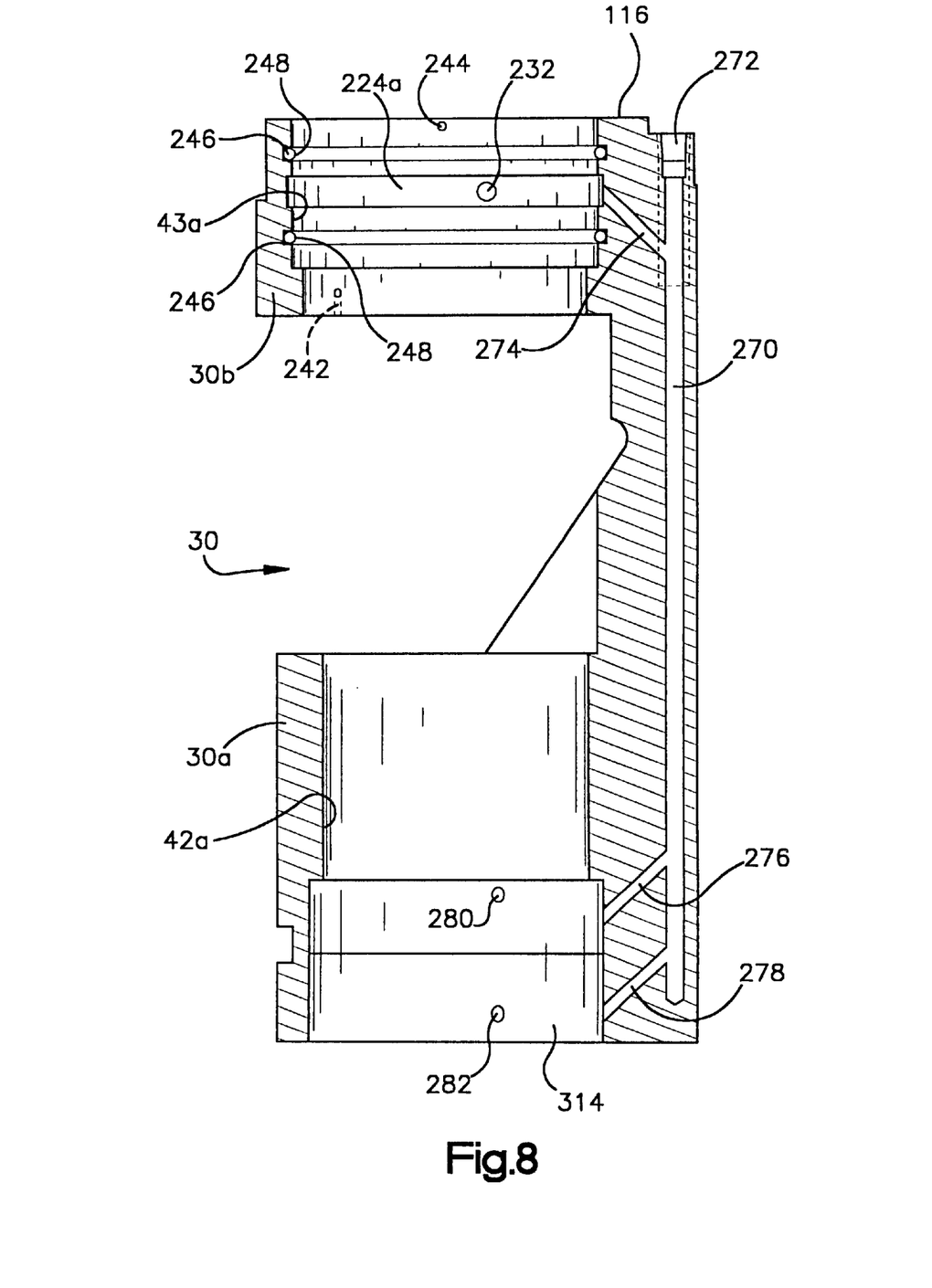
FIG. 8 is a sectional view of a portion of the spindle carrier of FIG. 7 showing one spindle opening and a portion of the spindle carrier drive shaft as seen from a plane indicated by the line 8—8 in FIG. 7.
Figure 9:
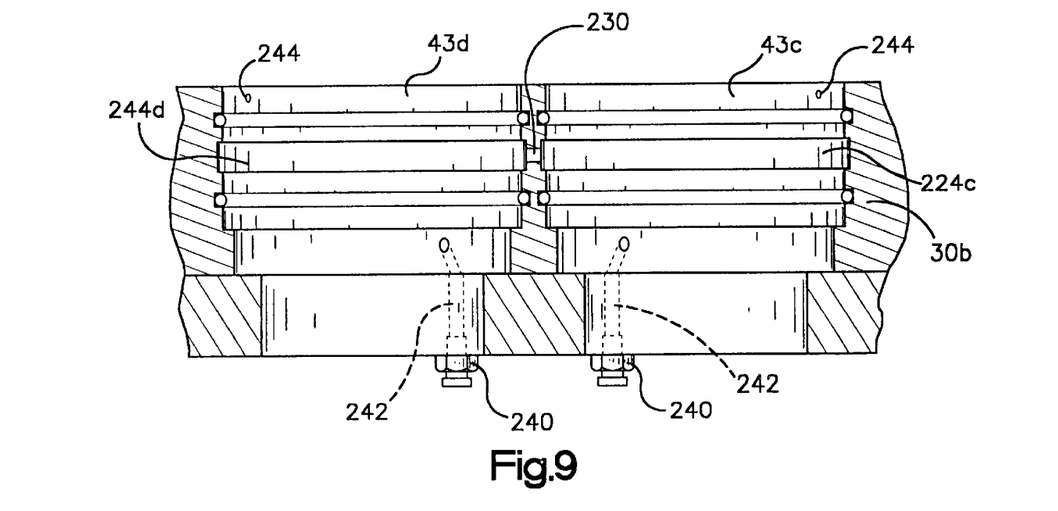
FIG. 9 is a sectional view of a portion of the spindle carrier of FIG. 7 as seen from a plane indicated by the line 9—9 in FIG. 7.
Figure 10:
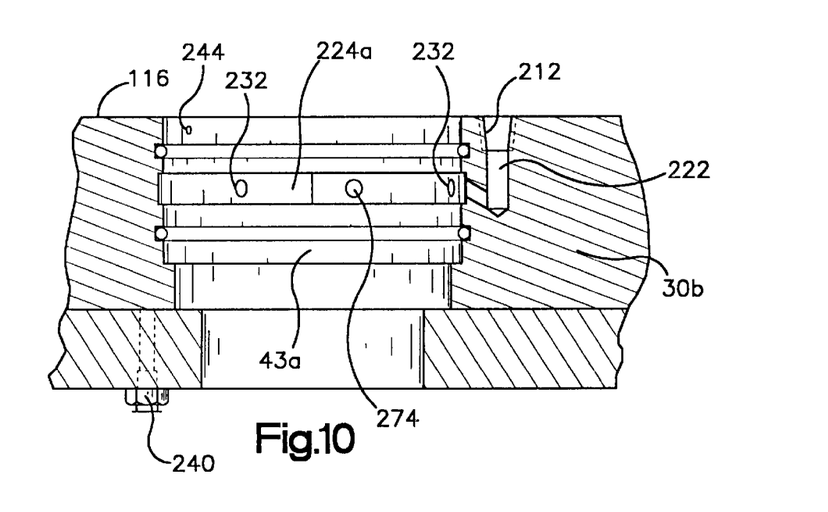
FIG. 10 is a sectional view of a portion of the spindle carrier of FIG. 7 as seen from a plane indicated by the line 10—10 in FIG. 7.

FIGS. 7–12 depict a fluid delivery manifold system defined by the spindle carrier 30 for supplying pressurized air input to the carrier through coupling 226 to the front and rear spindle bearings 200, 202 supporting the spindles. FIG. 7 is an end view of the spindle carrier 30 with the individual spindles 40a–40f removed for ease in depiction. FIG. 10 is a section view through the bore 43a supporting spindle 40a in conjunction with bore 42a. The fluid input opening 212 in the rear end 116 of the spindle carrier 30 has a threaded internal bore which accommodates coupling 226. Extending from input opening 212 is an entry passageway 222 which communicates with a circumferential notch in bore 43a which defines an annular passageway 224a. Each of the multiple spindles is surrounded by a similar passageways 224b–224f. The passageways 224a–224f are interconnected by drilled conduits 230 between spindle bores 43a–43f. These drilled conduits 230 are seen in phantom in the end view of FIG. 7 and entries 232 to these conduits are depicted in FIG. 10. Pressurized fluid is routed through the conduits 230 to pressurize each of the circumferentially extending passageways 224a–224f.

As can best be seen in FIG. 9, six grease fittings 240 (two of which can be seen in FIG. 9) in fluid communication respective grease passageways 242 extend to openings in bores 43a–43f to permit lubrication of the six rear spindle bearings 202. The grease fitting 240 includes a check valve (not shown) to prevent reflux of injected grease. Corresponding weep holes 244 extending from the bores 43a–43f to the spindle carrier outer peripheral surface 44 are provided to allow excess grease to seep out of the respective rear spindle bearings. Two circumferential grooves 246 in the bores 43a–43f which are in spaced apart relation to the passageways 224a–224f seat O-rings 248 which sealingly engage an outer surface of an outer ring or cup 250 of respective rear spindle bearings 202.

Figure 12:
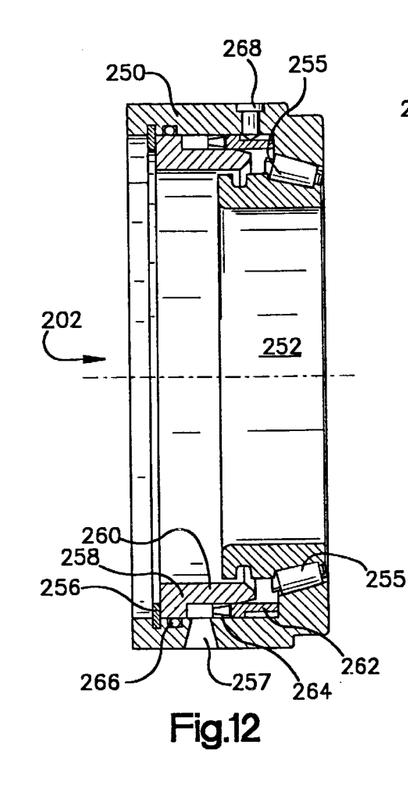
FIG. 12 is an enlarged section view of a portion of the spindle carrier of FIG. 7 showing a back spindle bearing.

The pressure in the passageways 224a–224f applies a preload to the rear spindle bearings 202 disposed in the bores 43a–43f. The preferred rear spindle bearing 202 is commercially available from the Timkin Company under the trade designation "Hydra-Rib Bearing." The structure of the "Hydra-Rib" rear spindle bearing is illustrated in FIG. 12 and includes the cup 250 and a cone 252 which trap a set of tapered roller bearings 254. Individual rollers 254 are maintained in a spaced apart relationship by a roller bearing cage 255 of conventional design. The cup 250 includes a groove in its inner peripheral surface which seats a snap ring 256 and also defines a through passageway 257 for introduction of a fluid under pressure for applying a preload to the tapered roller bearings 254. The rear spindle bearings 202 are positioned in their respective bores 43a–43f such that the spindle bearing passageway 257 is aligned with and in fluid communication with the spindle carrier bore passageways 224a–224f.

An annular cylinder body 258, axially supported by the snap ring 256, includes an arm 260 which guides a floating piston ring 262. When fluid pressure is applied through passageway 257, the piston ring 262 is forcefully pushed against an edge of each tapered roller bearing cage 254 thereby loading the bearing 202. A ring seal 264 is provided to maintain a pressure seal between the pressurized passageway 257 and an interior region of the bearing. An O-ring 266 disposed in a notch in the inner peripheral surface of the cup 250 sealingly engages the cylinder body 258. The cup also includes a lubrication passageway 268 which permits the injection of lubricant into a region where the piston ring 262 contacts roller bearing edges. Further details concerning the construction and arrangement of such a bearing are available in Timkin product literature which is incorporated herein by reference.

The pressurized fluid which enters the spindle carrier 30 through the fluid inlet opening 212 is also used as a sealing mechanism to prevent contaminants from entering a region of the front spindle bearings 200 as relative rotation between the spindles 40a–40f and spindle carrier occurs. As seen in FIG. 8, an axially extending bore 270 is drilled into the spindle carrier 30 from the carrier rear end 116. An opening of the bore is then sealed with a plug 272 (which also can be seen in FIG. 7). The axial bore 270 provides a fluid delivery path for fluid under pressure in passageway 224a to bores 42a–42f in upright 22a. An angled bore 274 connects pressurized passageway 234a with axial bore 270, while angled bores 276, 278 provide fluid communication between axial bore 270 and bore 42a. The angled bore 274 is also seen in FIG. 10.

Figure 11:
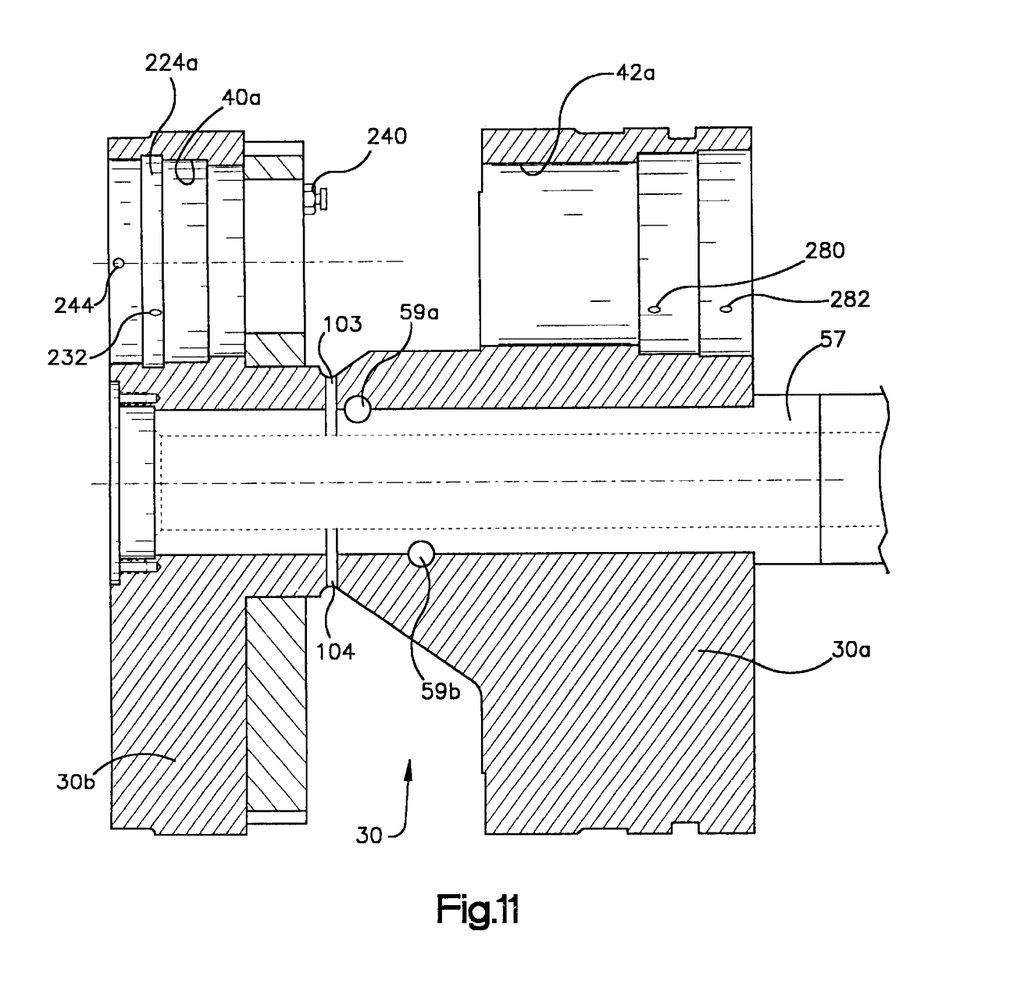
FIG. 11 is a sectional view of a portion of the spindle carrier of FIG. 7 showing a spindle opening and the spindle carrier drive shaft aperture with the spindle and spindle carrier drive shaft removed.

As with the passageways 224a–224f in upright 22b, the bores 42a–42f are interconnected by two sets of drilled conduits (not shown but are axially aligned with conduits 230 seen in phantom in FIG. 7) between bores. Entries 280, 282 to respective sets of drilled are seen in FIGS. 8 and 11. The pressurized fluid supplied to bore 42a via passageways 276, 278 to is routed through the respective sets of conduits to provide two air seal regions surrounding each of the front spindles bearings 200.

Turning to FIG. 13, each of the front spindle bearings 200 is comprised of a set of caged tapered rollers 290 secured between an inner ring or cone 292 coupled to an outer peripheral surface 296 of the spindle 40a. Preferably, the rollers 290 are located and oriented so as to be aligned with the line of action of the front spindle carrier bearings 110. That is, lines drawn perpendicularly to a cone contacting surface each roller 290 would intersect at a point X (FIG. 3) which is situated forward of the front end 30' of the spindle carrier 30 and rearwardly of the plane Y—Y extending through a front surface of each spindle collet 92.

To prevent lubricant and other contaminants from seeping into the front spindle bearings three shallow grooves 298 are milled into the outer peripheral surface 296 of the spindle 40a rearwardly of the spindle nose 94. The grooves 298 serve as a labyrinth seal. When the grooves fill with lubricant which seeps in between the spindle peripheral surface 296 and an annular air seal member 300 and the spindle 40a rotates with respect to the spindle carrier 30 the fluid in the groove forms a hydraulic seal which impedes the progress of other lubricant makings its way toward the bearing 200. In addition to the labyrinth seal protecting each of the spindle bearings 200 from contamination, the pressurized fluid routed to the bores 42a–42f through passageways 276, 278 and corresponding sets of conduits form an air seal on either side of the bearings 200 to further protect the bearings. The annular air seal member 300 is seated in a counterbored section of the spindle carrier 30 adjacent the carrier front end 120 and includes a conduit 302 which is in fluid communication with passageway 278. The air seal member 300 is comprised of impermeable bronze and is secured to the spindle carrier 30 by two screws 304. Two O-rings (not shown) seated in circumferential grooves 306 sealing engage a surface of the spindle carrier 30. At an outlet end of the air seal member conduit 302 (that is, an end opposite an end adjacent the spindle carrier) is a permeable bronze ring 308. The pressurized air leaks through the ring 308 along the spindle outer peripheral surface 296 thereby preventing any contaminants which traversed the labyrinth seal from progressing to the front spindle bearing 200.

A second annular air seal member 310 and permeable bronze ring 312 provide an air seal on the other or rearward side of the bearing 200. The second air seal member 310 is disposed in the spindle carrier counterbore and axially secured between a circumferential stepped portion 314 of the spindle carrier 30 and a vertically oriented surface of the bearing cup 294. The second air seal member 310 includes an air passage conduit 316 in fluid communication with passageway 276 and an O-ring (not shown) is disposed in an annular groove in an outer peripheral surface of the member to sealingly engage a surface of the spindle carrier 30. The pressurized air passes through conduit 316 and leaks through ring 312 to provide a second air seal. The air leaks out along the spindle outer peripheral surface 296.

The advantage of having two air seals axially surrounding each of the front spindle bearing 200 is that the two air seal air flows intersect at the bearing and create a "dead" zone of air, that is, no air flow. All the leaking air must escape in an axial directions away from the bearing 200 taking any contaminants away from the bearing.

It should be noted that the bar machine shown in the drawings is a six spindle machine wherein the spindles are sized to hold 1¼" bar stock. It should be appreciated, however, that present invention is equally applicable to four or eight spindle bar machines and to bar machines having spindles sized to run other bar stock sizes. Moreover, the present invention could also be used advantageously in chuckers, which are similar in many respects to bar machines, e.g. an indexable spindle carrier mounted in a bore, the spindle carrier supporting a plurality of rotating spindles. In a chucker, workpieces are not defined by a section of bar stock pushed through a spindle. Rather, the workpieces are normally individual cast or forged parts which are inserted into an open spindle collet. The collet closes and the workpiece is secured in the rotating spindle. The spindle carrier indexes moving the spindle through successive indexing positions where machining operations are performed.

The present invention has been described with a degree of particularity. It is the intent, however, that the invention include all modifications and alterations from the disclosed design falling within the spirit or scope of the appended claims.

What is claimed is:

1. A multiple spindle bar machine comprising:
    a) a generally cylindrical spindle carrier that supports multiple spindles at angularly separated locations about a circumference of the spindle carrier for rotating multiple elongated workpieces which extend from the spindle carrier to angularly separated workstations at one end of the spindle carrier;
    b) first and second spaced apart uprights each having an inner surface defining a throughbore dimensioned to receive the generally cylindrical spindle carrier wherein each upright has a stepped portion that extends circumferentially around each of the inner surfaces adjacent an outside face of each upright;
    c) first and second sets of tapered roller bearings disposed in the stepped portions of the first and second uprights respectively wherein each set of tapered roller bearings circumferentially extends around an outer surface of the spindle carrier to rotatably support the spindle carrier within the spaced apart uprights, each of the first and second sets of roller bearings including tapered rollers that rotate upon indexed movement of the spindle carrier and have a roller axis of rotation which intersects an axis of rotation of the spindle carrier;
    d) bearing loading means for applying a force on the first and second set of tapered roller bearings to minimize lateral movement of the bearings disposed in the stepped portions of the upright inner surfaces and thus minimize movement of the spindle carrier and workpieces supported by the spindle carrier in a direction parallel to the axis of rotation of the spindle carrier and secure the workpieces relative to the angularly separated workstations; and
    e) bearing sealing means for sealing the first and second sets of roller bearings from external contaminants.

2. The bar machine of claim 1 wherein the spindle carrier includes a first end and a second end, the first end of the spindle carrier adjacent the workstations where portions of bar stock extending from and supported by the spindle carrier are machined, wherein each tapered roller of the first set of roller bearings at the end of the spindle carrier adjacent to the workstations is oriented in the stepped portion of the first upright such that a line extending perpendicularly from a tapered outer surface of the roller facing the spindle carrier axis of rotation intersects the spindle carrier axis of rotation at a point spaced outwardly from an outside face of the first end of the spindle carrier.

3. The support structure of claim 2 wherein the spindle carrier rotatably supports a set of spindles and each spindle includes a workplece holding collet extending outwardly beyond the first end of the spindle carrier and wherein for each tapered roller of the first set of roller bearings the line extending perpendicularly from the tapered outer surface of the roller facing the spindle carrier axis of rotation intersects the axis of rotation inwardly of a plane extending through a distal portion of each collet which is disposed furthest away from the spindle carrier first end.

4. The bar machine of claim 1 further including spindle bearing loading means for applying a fluid pressure against at least one set of roller bearings supporting each of the spindles to minimize lateral movement of the set of roller bearings subject to said fluid pressure.

5. A multiple spindle bar machine comprising:
    a) a base having a headstock coupled thereto;
    b) a drive system for simultaneously rotating multiple bars and having a drive gear coupled to a spindle drive shaft;
    c) a plurality of spaced apart rotatable bar holding spindles, each spindle having a coaxial spindle gear connected to the drive gear and being journaled in a spindle bearing; the spindle bearing including tapered roller bearings; and
    d) a rotatable cylindrical spindle carrier mounted in an opening in the headstock supporting the plurality of spindles within a plurality of spindle bearings and including a throughbore aligned with a longitudinal axis of the spindle carrier and an interior manifold for routing pressurized fluid to preload the plurality of spindle bearings that support the bar holding spindles;
    e) said spindle drive shaft extending through the spindle carrier throughbore and having the drive gear attached to an end of the drive shaft to intermesh with each of the spindle gears and thereby rotate the spindles, the drive shaft including a generally cylindrical hollow cavity co-axially extending through the length of the drive shaft, a fluid coupling at an end of the spindle drive shaft removed from the drive gear for injecting pressurized fluid into the hollow cavity and a fluid coupling means at the drive gear end of the drive shaft for routing fluid from the drive shaft hollow cavity to the spindle carrier interior manifold.

6. The multiple spindle bar machine of claim 5 wherein the fluid coupling means at the drive gear end of the drive shaft comprises a connector assembly including a swivel connector, a second connector and a tube connected therebetween, an end of the swivel connector coupled to the drive gear end of the drive shaft and in fluid communication with the drive shaft hollow cavity and an end of the second connector coupled to the spindle carrier and in fluid communication with the spindle carrier interior manifold.

7. The multiple spindle bar machine of claim 5 further including a set of tapered roller bearings disposed between the spindle carrier and a counterbore in an inner peripheral surface defining the headstock opening, each tapered roller bearing oriented in the counterbore such that for each roller bearing in the set of tapered roller bearings an acute angle is formed between an outer cylindrical surface of the spindle carrier and a portion of a tapered outer surface of the roller bearing facing the outer cylindrical surface of the spindle carrier.

8. The multiple spindle bar machine of claim 7 wherein the set of tapered roller bearings is disposed between inner and outer annular support members and the set of roller bearings is located and oriented such that for each tapered roller bearing in the set of roller bearings a perpendicular line drawn from an inner support member contacting surface of the roller bearing would intersect the longitudinal axis the spindle carrier at a point spaced outwardly from an end of the spindle carrier.

9. The multiple spindle bar machine of claim 5 wherein the headstock includes two spaced apart uprights having aligned throughbores dimensioned to accept the spindle carrier, each upright having an annular stepped portion in a peripheral surface adjacent its respective throughbore and a set of tapered roller bearings disposed in each upright's annular stepped portion to support the spindle carrier.

10. A bar stock machining apparatus comprising;
   a) a motor having a motor output shaft for providing a motive force for rotating multiple bars during machining;
   b) a drive shaft coupled to the motor output shaft;
   c) a base supporting the motor and rotatably supporting the drive shaft for rotation about a rotation axis;
   d) a spindle carrier mounted to the base for indexing portions of bars extending from an end of the spindle carrier through multiple work positions adjacent one end of the spindle carrier;
   e) a plurality of spindles rotatably supported by the spindle carrier and coupled to the drive shaft for clamping and rotating one or more of the bars at high speed during machining; and
   f) two annular roller bearings mounted in spaced apart annular stepped portions in the base and disposed between the base and an outer surface of the spindle carrier for supporting the spindle carrier wherein one of said annular roller bearings includes a plurality of tapered rollers circumferentially spaced in one of the base stepped portions, wherein each tapered roller for the one bearing defines a line of action extending away perpendicularly from a surface of the tapered roller to intersect an axis of rotation of the spindle carrier at a point that is spaced from the end of the spindle carrier that faces the work positions.

11. The apparatus of claim 10 where the spindle carrier includes a plurality of annular bearings for rotatably supporting the spindles where at least one spindle bearing for each spindle is hydraulically loaded by a fluid delivered through a fluid delivery conduit system in the spindle carrier.

12. The apparatus of claim 11 wherein the drive shatt includes a passageway in fluid communication with the spindle carrier fluid delivery conduit system for delivering the fluid to the fluid delivery conduit system to hydraulically load the at least one spindle bearing for each spindle.

* * * * *